2,874,189
PHARMACEUTICALS

Dominic D. Micucci, Havertown, Souren Avakian and Robert R. Brendel, Oreland, and Gustav J. Martin, Philadelphia, Pa., assignors to The National Drug Company, Philadelphia, Pa., a corporation of Delaware No Drawing. Application March 28, 1957
Serial No. 649,016

7 Claims. (Cl. 260—558)

This invention relates to and has for its object, the provision of a novel series of chemical compounds and methods for their preparation, the compounds being useful as medicinals which affect the central nervous system and may, therefore, be employed as hypnotics or sedatives. The compounds of the invention includes those of the general formula

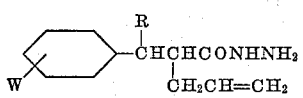

wherein W is a member of the group consisting of hydrogen, halogen (chlorine, bromine, iodine, fluorine), lower alkyl (e. g. methyl, ethyl, amyl, isopropyl, etc.) and lower alkoxy (e. g. methoxy, ethoxy, amyloxy, etc.); R is a member of the group consisting of hydrogen, and lower alkyl (e. g. methyl, ethyl, isopropyl, etc.).

These compounds may be prepared by condensing the desired acyl halide with hydrazine. For example, the compounds may be prepared by condensing the desired hydrocarbon halide (R'X) with the desired dialkyl malonate (or an alkyl acetoacetate) in an anhydrous organic medium, such as an alcohol (e. g. ethanol, isopropyl, etc.) or toluene, in the presence of equimolar amounts of an alkali metal, an alkali metal alkoxide, or an alkali metal hydride. The resulting product is then condensed with an alpha-phenylalkyl halide

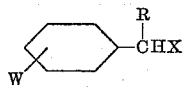

in a similar manner. The resulting ester is then hydrolyzed to the free diacid, which is in turn decarboxylated to the monoacid. This product is converted to the acid halide by means of a halogenating agent such as $SOCl_2$, $PCl_3$, or $PCl_5$, and the acid halide is treated with the desired amine to form the final product. This series of steps is graphically illustrated below (R, R', R'', R''' and W having the same meanings as above).

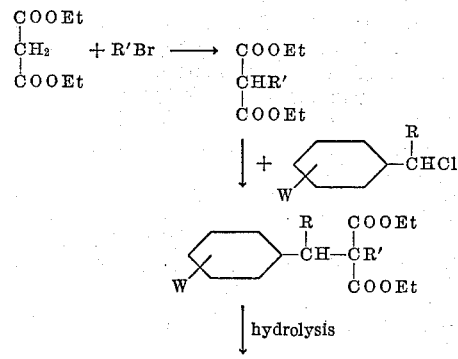

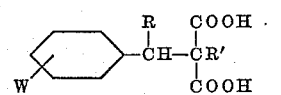

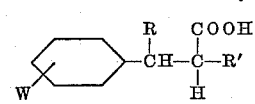

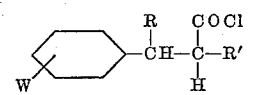

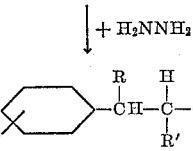

Where the R group in the alpha-phenylalkyl halide is other than hydrogen, the hydrocarbon halide (R'X) must be reacted with the dialkyl-malonate prior to the condensation with the alpha-phenylalkyl halide when the reaction is carried out in alcohol. In toluene, however, these alkylation steps may be carried out in either order. This is possible because, in toluene, for instance, MeOH formed from the reaction of NaOMe and alpha-phenylalkyl-malonic ester is distilled out, hence shifting the equilibrium:

$$NaOMe + \phi-CHCH(CO_2Et)_2 \rightleftharpoons \left[O-CHC(CO_2Et)_2\right]Na^+ + MeOH\uparrow$$

to the right eliminating the predominant R'X+NaOMe reaction. When sodium or sodium hydride and toluene are used, the order of alkylation is also immaterial since no competing side reactions are involved.

In the cases where the substituents in the molecule are such that the carbon atoms alpha and beta to the carboxamide group are both asymmetric centers and different, then there exist two isomeric dl pairs which may be separated by fractional crystallization.

Although it is desirable to use stoichiometric quantities of the reactants in the condensation, considerable variation is possible in each step. Likewise, other reaction conditions such as temperature, pressure and the inert solvents which are utilized, may be varied within wide limitations.

The compounds of the invention may be incorporated in the usual manner for ingestion, preferably by the oral route. Thus, the compounds may be tabletted or encapsulated; and, if desired, they may be made into suspensions, elixirs or other such liquid form. The dosage which is utilized will vary with the particular patient being treated. The dosage unit forms may, therefore, be conveniently made up to contain about 50–200 mg. (preferably 50 mg.) per dosage unit, e. g. tablet, capsule, teaspoonful, etc. Tablets may, of course, be scored to provide for further fractional dosages.

Following are working examples presented as illustrative of the invention. However, these examples are not in any way limitative and cannot be construed as any restriction on the invention.

EXAMPLE 1

A. Preparation of allylbenzylacetylchloride

Sodium, 11.5 g., is added in small pieces with stirring to 250 ml. absolute ethanol. Then 80.0 g. of ethyl malonate is added slowly to the sodium in alcohol solution. After one hour the reaction solution is heated to reflux and then 60.5 g. allyl bromide is added dropwise during the course of two hours. The stirring and refluxing is continued for two hours longer. Most of the alcohol is distilled from the reaction mixture and 125 ml. $H_2O$ is added to the cooled residue. The ester layer is separated and the water layer is extracted with 6 x 20 ml. portions of ether. The ester and ether extracts are combined, dried over anhydrous $Na_2SO_4$, and distilled. The fraction B. P.$_{30}$ 117–125° C. is collected and weighs 81 g.

The benzyl group is introduced into the molecule in similar manner using 28.0 g. diethylallylmalonate, 3.2 g. sodium, 80 ml. absolute EtOH and 17.8 g. benzyl chloride. This product, B. P.$_{0.5}$ 108–116° C., weighs 28 g.

The ester is then hydrolyzed, decarboxylated, treated with $SOCl_2$ in a manner identical with that given in Example 2–A to give the acid chloride intermediate, having a B. P.$_{0.5}$ of 78–82° C.

B. Preparation of allylbenzylacetylhydrazide

A 21 g. portion of allylbenzylacetylchloride (prepared as described in A) is added dropwise with stirring to a solution of 16 g. hydrazine in ethanol at a temperature of about 0° C. After the reaction has been completed, the excess hydrazine is removed under reduced pressure and the residue which remains is taken up in ethyl ether then extracted several times with 20% aqueous hydrochloric acid solution. This acid solution is then made basic by the addition of aqueous alkali (e. g. NaOH), extracted several times with ethyl ether, dried under anhydrous sodium sulfate then separated by distillation in vacuo. The product has a boiling point of 137–138° C./0.15 mm.

EXAMPLE 2

A. Preparation of allyl-α-phenylethylacetylchloride

Diethyl allyl-α-phenylethylmalonate intermediate is prepared in two ways, in an alcohol medium, just as described above, and in a toluene medium. In the alcohol method it is necessary to introduce the allyl group into the molecule first. The α-phenylethyl group is then introduced in similar manner. The alkylation of 50.0 g. diethylallylmalonate with 46.3 g. α-phenylethyl bromide, 5.75 g. Na and 125 ml. EtOH yields 60 g. of diethylallyl-α-phenylethylmalonate, B. P.$_{0.5}$ 115–120° C.

In the toluene method it is found that by distilling the alcohol formed from the reaction mixture, the groups could be introduced in either order. Diethyl-α-phenylethylmalonate, 52.8 g., is added with stirring to a suspension of 10.8 g. 95 percent NaOMe in 470 ml. dry toluene. The MeOH formed is removed by distilling through a short Vigreux column. The column is replaced with a condenser and 15.3 g. allylchloride is added dropwise over a period of two hours and the mixture refluxed for four hours. The reaction mixture is washed with water and stripped of toluene at diminished pressures. The yield of diethyl allyl-α-phenylethylmalonate intermediate, B. P.$_{0.3}$ 115–121° C., $n_D^{23}$ 1.5002, amounts to 42 g. (70 percent theoretical).

The diethyl allyl-α-phenylethylmalonate is also prepared by reacting 150 g. diethylallylmalonate with 42 g. 95 percent NaOMe suspended in 400 ml. dry toluene. The alcohol formed is distilled from the reaction mixture, which is then heated to reflux and 140 g. α-phenylethyl bromide added dropwise with stirring over a period of two hours. The mixture is heated and stirred for an additional two hours, filtered through a diatomaceous earth filter aid to remove NaBr and stripped of toluene under diminished pressures. The product, B. P.$_{0.3}$ 120–123° C., $n_D^{23}$ 1.5020, amounts to 144 g.

A mixture of 60 g. diethyl allyl-α-phenylethylmalonate intermediate and a solution of 48 g. KOH (85 percent), 102 ml. EtOH and 48 ml. $H_2O$ is refluxed for twenty-four hours. Most of the alcohol is removed by distilling on a steam bath under slightly diminished pressures. The residue is cooled, treated with 150 ml. $H_2O$ to dissolve the acid salt, and the resulting solution made strongly acid with concentrated hydrochloric acid. The oil product, 48 g. of crude allyl-α-phenylethylmalonic acid, is decarboxylated by heating in an oil bath maintained at 160–180° C. for six hours. Thionyl chloride (48 ml.) is added to the resulting acetic acid derivative and the solution heated on a steam bath for two hours and distilled. The acid chloride intermediate can then be used for further condensation.

B. Preparation of allyl-α-phenylethylacetylhydrazide

The procedure of Example 1–B is followed except that 22 g. allyl-α-phenylethylacetylchloride (prepared as described in Example 1–A) is substituted for the allylbenzylacetylchloride of the reference example. The product obtained has a boiling point of 145–147° C./0.08 mm.

EXAMPLE 3

A. Preparation of allyl-p-fluorobenzylacetylchloride
B. Preparation of allyl-p-fluorobenzylacetylhydrazide The procedure of Examples 1–A and B is followed except that 20 g. p-fluorobenzylchloride [1] is substituted for the 17.8 g. benzylchloride used in part A of the reference example. The hydrazide obtained as the final product has a melting point of 80–81° C.

EXAMPLE 4

A. Preparation of allyl-o-methylbenzylacetylchloride
B. Preparation of allyl-o-methylbenzylacetylhydrazide The procedure of Examples 1–A and B is followed except that 20 g. o-methylbenzylchloride is substituted for the 17.8 g. benzylchloride used in part A of the reference example. The hydrazide obtained as the final product has a melting point of 74–75° C.

EXAMPLE 5

A. Preparation of allyl-p-bromobenzylacetylchloride
B. Preparation of allyl-p-bromobenzylacetylhydrazide The procedure of Examples 1–A and B is followed except that 20 g. p-bromobenzylchloride [1] is substituted for the 17.8 g. benzylchloride used in part A of the reference example.

EXAMPLE 6

A. Preparation of allyl-p-chlorobenzylacetylchloride

Ethyl allylacetoacetate, 150 g. is added dropwise to a vigorously stirred suspension of 19.8 g. sodium hydride in 400 ml. dry toluene. Then, 142 g. p-chlorobenzyl chloride is added dropwise to the resulting clear solution. The reaction mixture is refluxed with stirring for 6 hours, made acid with anhydrous hydrogen chloride, filtered through Super-Cel and then concentrated to dryness.

The residue is dissolved in 100 ml. anhydrous ethanol and then added to a solution of 10 g. sodium in 400 ml. anhydrous ethanol. The reaction mixture is refluxed for six hours and distilled to remove most of the alcohol. The residue is taken up in about 200 ml. water, the layers separated and the aqueous layer extracted with 3 x 50 ml. of ether. The oil layer and ether extracts are combined, dried and distilled.

A mixture of 135 g. ethyl allylbenzylacetate in 75 ml. ethanol and 75 g. KOH (85%) in 75 ml. water is refluxed for 24 hours. Most of the alcohol is removed under slightly diminished pressure. The residue is dis-

---

[1] Prepared by refluxing for 7 hours, then distilling in vacuo, a mixture of 0.68 mol p-fluoro (or p-bromo) toluene, 1.1 mols sulfuryl chloride and 1 g. benzyl peroxide.

solved in 250 ml. water and acidified, with hydrochloric acid. The oil is isolated from the mixture, dried and distilled. The allyl-p-chlorobenzylacetic acid, B. P.$_{0.1}$ 143–145° C. is obtained in excellent yield. Thionyl chloride (48 ml.) is then added to the resulting acetic acid derivative and the solution is heated on a steam bath for 2 hours, then distilled. The resulting acid chloride intermediate can then be used for further condensation.

B. *Preparation of allyl-p-chlorobenzylacetylhydrazide*

A 22 g. portion of allyl-p-chlorobenzylacetyl chloride is condensed with 16 g. hydrazine in ethanol in exactly the same manner as described in Example 1–B. Following strictly these procedural steps the desired hydrazide is obtained.

EXAMPLE 7

*Preparation of allyl-p-methoxybenzylacetylchloride*

Following the procedure of Example 1–A and B except that p-methoxybenzylchloride is substituted for the benzyl chloride of the reference example, the desired acetylchloride and hydrazide are obtained.

EXAMPLE 8

Following the procedure of Example 1–A and B except that p-fluorobenzylchloride is substituted for the benzyl chloride of the reference example, the desired acetylchloride and hydrazide are obtained.

EXAMPLE 9

Following the procedure of Example 1–A and B except that o-methylbenzylchloride is substituted for the benzylchloride of the reference example, the desired acetylchloride and hydrazide are obtained.

EXAMPLE 10

*Preparation of allylbenzylacetylhydrazide (alternate method)*

A solution of 24.0 g. triethylamine in 50 ml. CHCl$_3$, is added with shaking to a solution of 38.0 g. allylbenzylacetic acid in 50 ml. CHCl$_3$ cooled in an ice bath. The cooled solution is added dropwise to a vigorously stirred solution of 21.8 g. ethyl chloroformate cooled in an ice-acetone-bath at such a rate as to maintain a reaction temperature of −10 to −5° and the resulting mixture is then stirred for an additional 2 hours. Without removing the ice-bath, 20 g. 95% hydrazine is added dropwise and the mixture is stirred for additional 2 hours. The chloroform solution is separated from the insoluble oils and concentrated to dryness. The residue is taken up in anhydrous ethyl ether and extracted several times with 20% aqueous hydrochloric acid solution. The combined extracts are made alkaline with sodium hydroxide. The oil formed soon solidifies. The crude material weighs 25 g., M. P. 81–4° C. Recrystallization from ethyl ether-petroleum ether yields a purified product, M. P. 88–89° C. [Using the identical procedure with any of the other allylbenzylacetic acid derivatives of the invention one will obtain analogous products.]

This invention may be variously otherwise embodied within the scope of the appended claims. This application is a continuation-in-part of Serial No. 543,616, filed October 28, 1955, and now abandoned, same inventors.

We claim:

1. Compounds of the group consisting of those having the general formula:

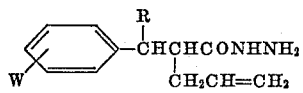

in which W is a member of the group consisting of hydrogen, halogen, methyl and methoxy and R is a member of the group consisting of hydrogen and methyl.

2. Alpha - allyl - alpha - (alpha - phenylethyl)-acetyl-hydrazide.

3. Alpha-allyl-alpha-benzylacetylhydrazide.

4. Alpha-allyl-alpha-o-methylbenzylacetylhydrazide.

5. Alpha-allyl-alpha-p-methoxybenzylacetyl-hydrazide.

6. Alpha-allyl-alpha-p-chlorobenzylacetylhydrazide.

7. Alpha-allyl-alpha-p-fluorobenzylacetylhydrazide.

References Cited in the file of this patent

Beilstein's Handbook Org. Chem., 4th ed., vol. 9, 2nd suppl., page 421 (1949).